United States Patent Office 3,775,350
Patented Nov. 27, 1973

3,775,350
FLAME RETARDANT INTEGRAL SKIN POLYURETHANE FOAM
Benjamin P. Juhas, Canal Fulton, Ohio, assignor to The General Tire & Rubber Company, Akron, Ohio
No Drawing. Filed July 10, 1972, Ser. No. 270,128
Int. Cl. C08g 22/46
U.S. Cl. 260—2.5 AZ                    7 Claims

ABSTRACT OF THE DISCLOSURE

A very minor amount of finely divided carbon black added to a polyurethane integral skin foam formulation will improve the flame retardency of the resulting foams. These flexible and semiflexible foam structures, also, have good tensile strength, tear strength, loading and elongation properties. Surface coatings or finishes applied to the surface of the integral skin of the foam do not discolor on exposure to ultraviolet light.

BACKGROUND OF THE INVENTION

Polyurethane foam structures with an integral skin can be obtained without need to apply a skin-forming composition to the shaping mold before the casting of the foam-forming composition (cf. U.S. Pat. 3,099,516). This has been accomplished by adjusting the temperature of the molding surface relative to the foam-forming mixture. In a further modification, there is added to the foam-forming mixture, an aromatic diamine having active hydrogen groups plus other groups which moderate the reaction of the diamine with the other constituents of the foam-producing mixture, especially methoxy and halogen groups, e.g., methylene-bis-orthochloroaniline (cf. French Pat. No. 1,448,751). In such operations, the thickness and other characteristics of the integral skin on the resulting foam structure is to some extent controlled by the temperature of the mold at the time of casting of the foam-forming material so that the integral skin may vary from a very thin covering of little strength to a relatively thick skin separated from the central lightweight foam body by an intermediate dense foam zone.

The method of producing integral skin polyurethane foam structures using aromatic diamines involves certain disadvantages. For one thing, the presence of the aromatic diamines in the foams causes discoloration of any top coats or finishes and a faster yellowing of the foam structure on exposure to ultraviolet light. Secondly, as the density of the foam is lowered by the addition of larger quantities of organic pneumatogen, the integral skin on the foam structure tends to develop pinholes which detract from the appearance of the structure and make it difficult to apply decorative top coatings or finishes.

Regardless of the method of production of a skin surface on a foam molded part, top finishes or coatings covering the skin are generally necessary for acceptance by the end user. For example, such finishes or coatings provide the matching color for interior trim, give proper gloss, durability and scuff resistance and other characteristics needed for the end use. Obviously, it is highly detrimental for the molded foam part to cause such surface finishes or coatings to discolor when the final product is exposed to ultraviolet light, particularly where color matching among separate parts to a vehicle interior must be maintained, since such discoloration becomes immediately apparent.

It is also known in the techniques for producing polyurethane structures to use graft polymers of an ethylenic monomer on a polyol backbone as an active hydrogen material employed in the polyurethane forming reaction to create the final polymer (see U.S. Pat. No. 3,383,351).

As an example, such prior development proposes for use as a polyol component of a polyurethane forming composition, a graft polymer prepared by polymerizing an unsaturated material, e.g., styrene or an acrylic ester, on a polypropylene ether diol terminated with hydroxyl radicals. However, such a polyurethane formulation when used to produce foam structures gives products having poor tear strength and low elongations, e.g., tear strengths between 1½ to 2 pounds per inch and elongations of about 70 to 100%.

The present invention is directed to polyurethane or polyurethane-urea foams which have an integral skin, are open-celled or close-celled, and are flexible or semiflexible, i.e., are not rigid. Integral skin foams with which the present invention is concerned are shown in U.S. Pat. No. 3,586,649 the disclosure of which is incorporated herein by reference to the same. Such foams employing certain aromatic diamines and "graft" polyols are characterized as being non-discoloring. In other words paints and lacquers applied to their surfaces do not discolor on exposure to ultraviolet light due to migration of some product or by-product from the foam.

OBJECTS

It is an object of this invention to provide a flexible or semi-flexible integral skin foam which is flame retardant.

These and other objects and advantages of the present invention will become more apparent to those skilled in the art from the following detailed description and examples.

SUMMARY OF THE INVENTION

According to the present invention it has been discovered that flexible and semiflexible integral skin polyurethan or polyurethane-urea foam structures made from certain aromatic amines and graft polyols can be rendered flame retardant by incorporating into the foam formulation prior to foaming a very minor amount of finely divided carbon black. These foams still exhibit their good tensile strength, tear strength and loading and elongation properties, and coatings applied to the surface of the integral skin of these foams do not discolor on exposure to ultraviolet light. The carbon black does not appear to affect one way or the other the discoloration of surface coatings. Although the foams as produced are gray to black in appearance, they can be suitably painted or coated if desired to match the surroundings in which they are to be used.

The carbon black should have a fineness or surface area of from about 5 to 165 square meters per gram (based on particle diameters as determined by the electron microscope); preferably, the carbon black should have a surface area of from about 100 to 130 square meters per gram. Also, the carbon black should have a structure index of from about 30 to 160 (DBP absorption; cc. of dibutyl phthalate per 100 grams of carbon black); preferably, the carbon black should have a structure index of from about 85 to 115. Examples of suitable carbon blacks are lamp-blacks, channel blacks, gas furnace blacks, oil furnace blacks, and thermal blacks and mixtures thereof. Lamp-blacks are generally made by burning petroleum or coal tar residues in open shallow pans. Channel blacks are made by burning gas in a limited supply of air in reciprocating channels or cylinders. Furnace blacks are made by burning gas or oil in a limited supply of air in refractory furnaces. Thermal blacks are made by cracking, or exothermic decomposition, oil or gas in preheated refractory furnaces containing little or no oxygen. A more detailed discussion of these carbon blacks will be found in the "Encyclopedia of Chemical Technology," Kirk-Othmer, Interscience Publishers, division of John Wiley & Sons, Inc., New York, 2nd ed., vol. 4, 1964, pp. 243–282 and Supplement, 2nd ed., 1971, pp. 91–108. See, also, "Dictionary of Rubber Technology," Craig, Butterworth & Co., Ltd., London, 1969, pp. 28–31, and "Synthetic Rubber," Whitby et al., John Wiley & Sons, Inc., New York, 1954, pp. 384–387 and 399–404. The disclosures of these references are incorporated herein by reference to the same. Of the foregoing blacks, it is preferred to use channel black.

From about 0.001 to 2.0 parts by weight of carbon black is used per 100 parts by weight of the final polyurethane. Preferably, from about 0.02 to 0.75 part by weight of carbon black is used per 100 parts by weight of the final polyurethane polymer. Lesser amounts do not appear to provide adequate flame retardency. On the other hand larger amounts may cause cell collapse during foaming or the formation of voids in back of the integral skin. In general, within the aforesaid ranges, the larger carbon black particles (smaller surface area) can be used in larger quantities whereas smaller amounts of the smaller particle size, or larger surface area carbon blacks, are used, especially in the preferred range.

The carbon black can be added to one or more of the ingredients used to make the foam and mixed therewith. However, it is preferred to disperse it in a small amount of the polyol (diol, triol or tetrol) or first make a dispersion of the carbon black in a portion of the polyol, and then mix the dispersion with the remainder of the polyol or polyol mixture.

Before being used the carbon black should be dried or freed of water or moisture to avoid irregular results or variations in foaming. However, the carbon black can contain $H_2O$ if the amount of $H_2O$ is known and calculated in the total amount of active hydrogen furnishing ingredients required for proper foaming.

DESCRIPTION OF THE PREFERRED EMBODIMENTS

The flame retardant integral skin foam of the present invention comprises the reaction product in the presence of an organic blowing agent of (A) a polyisocyanate,
(B) a graft polyol or a mixture of a graft polyol and a polyol other than said graft polyol,
(C) at least one aryl amine having at least two amino groups, and
(D) the carbon black described herein.

The polyisocyanates used are preferably diisocyanates but also tri- or poly-functional isocyanates can be used with the diisocyanates. Examples of polyisocyanates which may be used are: 1,4-butylene diisocyanate, hexamethylene diisocyanate, m-xylylene diisocyanate, p-xylylene diisocyanate, 2,4-dimethyl-1,3-xylylene diisocyanate, m-phenylene diisocyanate, p-phenylene-diisocyanate, 1-methyl phenylene-2,4-diisocyanate, 3-(a-isocyanate ethyl)-phenyl isocyanate, 1-methyl phenylene-2,6-diisocyanate, 2,6-diethyl phenylene-1,4-diisocyanate, diphenylmethane-4,4'-diisocyanate, diphenyl-dimethyl-methane-4,4'-diisocyanate, or naphthylene-1,5-diisocyanate. Isocyanates with more than two spaced —NCO groups may also be used, such as for example the poly phenylene polyisocyanates, "PAPi" (polyphenyl polymethylene polyisocyanate). Additional polyisocyanates, useful in making polyurethane foams, are known in the art, e.g., see U.S. Pats. Nos. 3,036,996; 3,208,959 and 3,285,879. Mixtures of different isocyanates can be used in preparing the foams.

Examples of suitable graft polyol or polymeric polyol compositions and their method of preparation are to be found in U.S. Pats. Nos. 3,294,711, 3,304,273 and 3,383,-351, the disclosures of which are incorporated herein by reference. See, also, Kuryla et al., "Journal of Cellular Plastics," March 1966, pp. 84–96. These graft polyol compositions may contain amounts of polyol homopolymer and of vinyl homopolymer or of vinyl copolymer if more than one vinyl monomer was used during the graft polymerization.

Acrylic type monomers are used in forming the best graft polymer polyols for use in the invention. A preferred group of monomers are acrylonitrile, methacrylonitrile and ethacrylonitrile. Another class preferred type of vinyl monomer are vinyl lactams, e.g. 1-vinyl-2-pyrrolidone (see U.S. 3,053,801).

The graft polymer polyols are products obtained by polymerizing or copolymerizing olefinically unsaturated monomers while dissolved in or while in contact with a polyol. A polyalkylene ether or a polyester polyol containing a plurality of hydroxyl groups are examples of such polyols. The product obtained by polymerization of the vinyl monomers in contact with, i.e., in situ in, the polyol is in part a graft of the ethylenic monomer on the polyol backbone. It can contain some homopolymer of the ethylenic compound as well as some ungrafted polyol.

The molecular weight of the polyols depends in large measure on the end product desired. The optimum molecular weight is dependent on the number of active hydrogen containing groups, being larger when the number of such groups is increased as the lengths of the branched chains between such groups are shorter for a given molecular weight. For the non-rigid foams of the invention, the molecular weight of triols is usually above 400 and preferably between 600 and 7500. Higher molecular weights may be used, however. When the number of hydroxyl groups is more than three, then an increase in minimum molecular weight of the polyol above 500 is usually made to provide equivalent separation of hydroxyl groups.

The polyether polyols may be linear polymers such as polypropylene ether glycol or mixed condensates of propylene oxide and butylene oxide, allyl glycidyl ether and the like having only two hydroxyl groups, or they may be branched chain polyols having 2 to 6 hydroxyl groups such for example as the adducts of propylene oxide or other polymerizable monomeric alkylene oxide or mixture thereof on a polyhydric alcohol, such as glycerine, trimethylol propane, triethanol amine, pentaerythritol, sorbitol, and the like, or with a compound such as ethylene diamine, or they may be mixed polyethylene-propylene oxide adducts on the polyhydric alcohols with 2 to 6 hydroxyl groups. Mixtures of polyols may also be used. These polyols can be end-capped with ethylene oxide, partially or entirely, to provide at least some primary hydroxyl groups.

While polyether polyols are preferred for polymerization of vinyl monomers in contact therewith, some of the benefits of the present invention may be obtained when the polyol is a polyester such as the reaction product of adipic acid or sebacic acid with a major amount ethylene glycol, diethylene glycol, triethylene glycol, propylene glycol, butylene glycol and the like. Hydroxy oils such as castor oil and tall oil may also be used. The polyester is preferably saturated but slightly unsaturated polyesters such as those prepared by a process wherein saturated acids such as adipic, phthalic and the like are substituted in minor part (less than 25%) by an unsaturated acid such as maleic or fumaric acid can also be used. Glycol component may also be unsaturated as for example monoallylether of trimethylol propane or 2-butendiol-1,4.

Examples of unsaturated monomers for grafting on polyols and/or for polymerizing in admixture with said polyols besides the preferred ones mentioned above are other acrylic type monomers, e.g., esters of acrylic and methacrylic acids such as methyl acrylate, ethyl acrylate, butyl acrylate, methyl methacrylate, ethyl methacrylate, n-hexyl methacrylate, glycol dimethacrylate and the like, vinyl esters, e.g., vinyl acetate and vinyl propionate; styrene butadiene, alphamethyl styrene may be used as well.

The monomers to be used should be substantially free of hydroxyl groups reactive with —NCO groups.

The vinyl monomer which is reacted in admixture with the polyol preferably has less than 10 aliphatic carbon atoms and preferably contains —CN or —CO— groups. When the percentage of monomer to polyol is about 5%, the improvement in the foam is substantially evident. As much as 50% of the grafted polyol may consist of polymerized unsaturated monomer units. The graft polyol has an average molecular weight of from about 400 to 15,000; preferably it has an average molecular weight of from about 400 to 6500.

The amount of the graft polymer polyol used in polyurethane formulations prepared according to the invention may be varied although superior results are attained using certain proportions. In regard to a maximum proportion, the graft polymer polyol may constitute the only —OH group component of the polyurethane formulation. In regard to a minimum proportion, sufficient should be used to inhibit UV discoloration of the coatings or finishes on the foam structure. Products having the best values in UV stability, tear strength and elongation are obtained when the graft polymer constitutes 30 to 70 percent of the total —OH component of the polyurethane formulation.

Advantageously, the new foam structures will be made from formulations having —OH group containing ingredients other than the required graft polymer polyol. Polyesters can be used for this purpose, but polyethers are preferred. The polyesters are not as hydrolytically stable as the polyethers. Partially (15% minimum) or fully primary hydroxyl-capped polyoxyalkylene polyols, e.g., diols, triols, tetrols, etc., with a molecular weight between about 400 and 7500 are preferred. These polyols are made by the polymerization of an alkylene oxide such as propylene oxide, butylene oxide, and so forth on ethylene glycol, propylene glycol, trimethylol propane, glycerol, pentaerythritol, sorbitol, and so forth. They may be end-capped with ethylene exide to provide primary hydroxyl groups. Examples of other polyols conventionally used in making polyurethane foams can be found in numerous publications, e.g., see U.S. Pats. Nos. 3,036,966 and 3,285,879. These polyols, as contrasted with the required graft polymer polyols, may constitute up to about 70 percent of the —OH group containing component of the foam-forming formulations.

At least one aryl amine is used and is selected from the group consisting of (A)

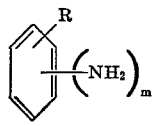

where R is halogen or methoxy and $m$ is 2 or 3;

(B)

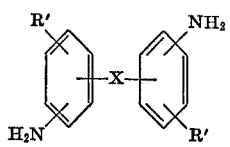

where X is $C_1$ to $C_{10}$ alkylene, oxygen,

or a bond joining the two aromatic rings and where R' is hydrogen, halogen (Br, Cl, F or I) or methoxy, at least one R' being halogen or methoxy;

(C)

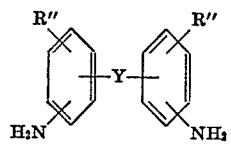

where Y is thio, polythio, seleno, polyseleno, telluro or polytelluro and where R'' is hydrogen, halogen (Br, Cl, F or I) or methoxy;

(D)

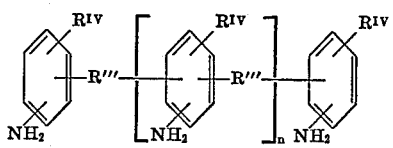

where R''' is $C_1$ to $C_{10}$ alkylene, $R^{IV}$ is hydrogen, halogen (Br, Cl, F or I) or methoxy, at least one $R^{IV}$ being halogen or methoxy, and $n$ is 0.5 to 2; and (E) A mixture of at least one aryl amine of said group of (A), (B), (C), and (D) and up to 50 mol percent of said mixture of at least one aryl amine selected from the group consisting of

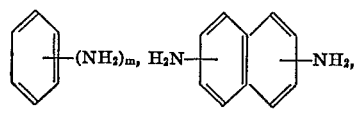

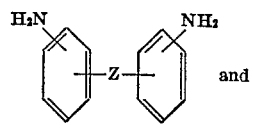
and

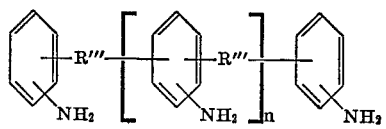

where Z is $C_1$ to $C_{10}$ alkylene, oxygen,

or the bond joining the two aromatic rings, R'' is $C_1$ to $C_{10}$ alkylene, $m$ is 2 or 3 and $n$ is 0.5 to 2.

Within this class of materials from which either single compounds may be used in carrying out the invention or mixtures of two or more such compounds, a preferred group of the diamines are those having the following formula:

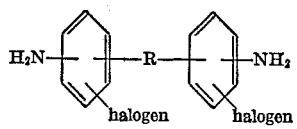

wherein R is a 1 to 3 carbon atom alkylene radical, e.g., methylene, ethylene, etc. Compounds in which R is methylene are especially useful.

Another group of very useful diamines are those having the following formula:

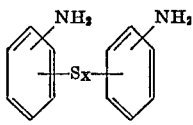

wherein X is an integer, e.g., 1, 2, etc.

Specific examples of aryl amines for use in the invention are:

methylene-bis-orthochloroaniline
2,4,6-triaminochlorobenzene
3,3'-dichlorobenzidine
3,3'-dimethoxybenzidine
3-amino-4-chloroaniline
bis(4-amino-3-chlorophenyl)oxide
bis(4-amino-2-chlorophenyl)propane
bis(4-amino-2-chlorophenyl)sulfone
bis(4-amino-3-methoxyphenyl)decane
3-dimethoxy-4-aminoaniline
bis(4-aminophenyl)sulfide
bis(4-aminophenyl)telluride
bis(4-aminophenyl)selenide
4-bromo-1,3-phenylenediamine
bis(4-amino-3-methoxyphenyl)disulfide
4,4'-methylene bis (2-iodoaniline)
4,4'-methylene bis (2-bromoaniline)
4,4'-methylene bis (2-fluoroaniline)
4,4'-methylene bis (2-isopropylaniline)
4-aminophenyl-2-chloroaniline
polychlorophenyl polymethylene polyamine and the like and mixtures thereof.

Additional examples of specific compounds with the formulae hereinbefore stated that may be used can be found in U.S. Pat. No. 3,036,996, the disclosure of which is incorporated herein by reference. Further examples of diamines usable in polyurethane foam products are found in U.S. Pats. Nos. 3,261,813; 3,285,879 and 3,316,220.

With the sulfur, selenium and tellurium containing diamines it is not necessary that they be substituted with halogen or methoxy groups. However, in the case of hydrocarbon diamines or those containing oxygen,

or alkylene linkages, halogen or methoxy groups must be present to act as inhibitor groups or otherwise the diamines are too reactive to produce the desired skin forming operation. One inhibiting atom or group is sufficient in the bicyclic amines, but the preferred bicyclic amines contain two inhbiting atoms or groups.

Materials of this type are commercially available in technical grade or crude or impure forms which may be satisfactorily used, e.g., "LD-813," the reaction product of formaldehyde and orthochloroaniline having an average functionality of about 2.5 or above, e.g., 2½ to 3 or 4 amino groups per molecule. Such commercial materials may contain triamines or polyamines of functionality greater than two. See U.S. Pat. No. 3,405,162. These crude amines, also, can be made by nitrating the aromatic compound and reducing the polynitroaromatic to form the polyamino aryl compound without separating the di, tri and tetra amino isomers. Such materials alone are not as advantageous as those which have a functionality of 2.0, since the higher functionality materials tend to reduce tear resistance of the resulting foam structures. However, such crude amines or polyamines can be used alone where the foam structure is not subject to appreciable flexing or working such as in the pillars of automobiles and the like. These crude amines are preferably used in admixture with the amines of (A), (B) and (C) above.

Examples of non-substituted aryl amines, or mixtures thereof, which can be mixed in an amount up to 50 mol percent with the amines, or mixtures thereof, i.e., (A), (D), (B) and/or (C) above, are meta-phenylene diamine, paraphenylene diamine, naphthalene diamine, benzidine, bis(4 - amino - phenyl)methane, 1,2,3 - triaminobenzene, 1,2,4 - triaminobenzene, 4,4' - diaminodibenzyl, di(para-amino phenyl) ether, 3,3'-diamino diphenyl sulfone, poly phenyl polymethylene polyamine, 4,4'-diamino-diphenyl sulfone and the like.

The amount of the aryl amine is in part dependent upon its molecular weight and the quantity of polyols used in the foam producing mixture. In general, the proportion of such amine component plus total hydroxyl component to isocyanate component will be adjusted to give an —NCO to active hydrogen (—OH plus —NH₂) ratio of from about 0.85:1 to 1.2:1. Advantageously, a quantity of the aryl amine is used so that from about 3 to 35 percent by weight of the polyurethane results from reaction of the isocyanate with the amine component and from about 65 to 97 percent by weight results from reaction of the isocyanate with the hydroxyl component.

The graft copolymer appears to produce several unique results, viz., it helps in the formation of the integral skin and it eliminates the discoloration of surface coatings on the foam structures on exposure to ultraviolet light. There is also a cooperative effect between the aryl amine and the graft polymer polyol. Thus, without the aryl amine, the foam structure has poor tear strength and low elongation.

An organic pneumatogen is used to create a desirable overall light density in the foam structure. Advantageously, the pneumatogen is a fluorocarbon or mixture thereof. Water is generally to be avoided, and only the water incidentally present as residual water in the carbon black, polyols, amines and other foam formulation ingredients, about up to a total 1% maximum, should be tolerated. The fluorinated alkanes having a boiling point below 80° C. give the best results. Of such blowing agents trichloro-fluoromethane is usually preferred although other fluorinated alkanes having a boiling point between —50° C. and 110° C. or even higher, may be used if desired. The organic pneumatogen is used in an amount to give the required product density. For the preferred density and fluorocarbons, this component will amount to about 5 to 30 percent of the total foam-forming composition. Principles of the use of the fluorocarbons in the polyurethane foams are to be found disclosed in U.S. Pat. 3,072,582 which is incorporated herein by reference.

Any of the usual activators including a tertiary amine such as dimethyl benzyl amine, N-ethyl morpholine, per methylated diethylene tri amine and/or organo metal compounds are usually incorporated in order to accelerate the reaction (cf. U.S. 3,322,699). Also, these can be used as catalysts as well as tin compounds such as stannous octoate, stannous oleate, dibutyl tin dilaurate, and so forth. The catalyst may be introduced admixed with a carrier (in small amounts as compared to the total foam formulation) such as dibutyl phthalate, dioctyl phthalate and so forth. A small amount of conventional cell stabilizer such as for example as one of the silicone oils or any of the well-known stabilizers heretofore used for the commercial production of urethane foams are usable in the new methods. Silicone block copolymer oils known to the art for this use are preferred, e.g., silicone oil "L520," "L540," etc. Examples of other usable catalysts, activators and cell stabilizers, particularly silicone block copolymers, are given in U.S. Pats. Nos. 3,044,971; 3,060,137; 3,194,770 and 3,373,122, the disclosures of which are incorporated herein by reference. Such components are used in an amount required to perform their desired function as is known in the art, normally between about 0.001 to 2 percent of the total foam-forming composition.

Crosslinkers, if required, can also be used in minor amounts necessary to achieve the desired results. Examples of such compounds are glycerol, ethylene glycol, hexane triol, pentaerythritol, N,N,N',N'-tetrakis (2-hydroxy propyl) ethylene diamine and the like and mixtures thereof.

Suitable antidegradants for polyurethanes may be included in the formulation to protect against aging, particularly when exposed outdoors. See U.S. Pats. Nos. 2,915,496 and 3,208,959 on the use of alkyl substituted hydroxy aryl compounds, alkyl and aryl substituted phosphites, N,N'-dialkyl substituted phenylene diamines, and halogenated organic phosphites. Other known polyurethane antidegradants can be used. Some of this degradation such as the common yellowing of the polyurethane can be offset to some extent by the use of light stable diisocyanates or polyisocyanates which are known to the art. The aliphatic diisocyanates, durene diisocyanate, t-butyl tolylene diisocyanate and others can be used although some of them are expensive and hazardous. Also, it is preferred that the urethane foam forming ingredients such as the polyisocyanates, polyols, aryl amines, crosslinker, etc., be free of aliphatic unsaturation to further avoid degradation.

The polyurethane foams of the present invention can be made by the prepolymer process, the quasi- or semi-prepolymer process or the one-shot process.

In the one-shot process all of the foam forming ingredients are mixed together at one time. Two or more streams of compatible and mixed ingredients can be delivered to the mixing head of the foam machine to be mixed together at one time and then poured or dropped into the container or conveyor.

Where some of the foam ingredients are solids, waxy or viscous it may be necessary to warm, heat or melt them to insure proper mixing and foam formulation, e.g., to insure pumping to the mixing head and thorough mixing in the mixing head of the foam machine.

In preparing the formulation thorough mixing of the ingredients is required to get complete (as much as theoretically possible) reaction. Incomplete mixing will result in some of the amines of impurities therein migrating to the surface and causing staining or discoloration. Good mixing alone without the graft polyol still gives discoloration. It is necessary to have good mixing and to use the graft polyol to avoid discoloration.

In the foaming operation, either cold (room temperature) or hot molds can be used depending also on the desired thickness of the skin. If a low boiling fluorocarbon is used, it may be necessary to chill the mold. The mold acts as a heat sink to reduce the temperature of the foam adjacent the mold causing condensation of the fluorocarbon or preventing expansion of the fluorocarbon so the surface layers become dense and continuous. Metal molds (40–45° C.) are much preferred. Epoxy and polyethylene molds may be used but they may have to be cooled or chilled (32–35° C.). The mold temperature will depend on the formulation temperature and the thickness of skin desired, i.e., cold mold thick skin, hot mold relatively thin skin. The foam produced has an outer skin which may be microporous, is flexible or semi-rigid, not rigid, and is open and/or closed cell.

In general, the present process comprises:

(a) heating and mixing the polymer forming ingredients at a temperature of from about 10 to 85° C.

(b) casting the heated polymer mixture in a mold having a temperature adjusted to a predetermined value of from about 5 to 85° C.;

(c) allowing the cast polymer mixture to foam in the mold;

(d) allowing the foam to remain at the ambient temperature of the foam for from about 5 to 30 minutes or heating the mold and contained foam for from about 3 to 15 minutes at a temperature of from about 100° to 135° C. after the foam in the mold has risen to full height; and (e) removing the cured foam structure resulting from step (d) from the mold.

The resulting non-rigid polyurethane foam structures have an integral skin substantially free of pinholes, a tear strength of about 8 pounds per inch an an elongation of at least 200%.

Advantageously, the molds in which the polymer mixture is cast are made of metal and the mold is preheated before the polymer mixture is cast in the mold. Foam structures obtainable in this manner or in accordance with other preferred embodiments of the invention have an outermost integral skin, which can be thick or thin depending on whether a hot or cold mold was used, generally about 0.1 to 1.5 mm. of a density from about 40 to 60 lbs. per cubic foot, an intermediate thin layer adjacent the integral skin of up to about 2 mm. thick of a density of from about 20 to 40 lbs. per cubic foot, and a predominating mass of flexible or semiflexible foam of a density of from about 4 to 14 pounds per cubic foot.

The new integral skin foam structures may be used for many purposes without further processing. However, to provide increased abrasion resistance, create decorative effects or the like, it is frequently advantageous to apply outer coatings to the integral skin. Such outer coatings may be ordinary paints and lacquers, but special coatings are preferred. Any outer coating may be applied over the entire integral skin or only over part, e.g., in special function or decorative patterns. Heat reflective films or coatings, e.g., metallized coatings, light reflective coatings, e.g., reflective bead coatings or the like may be used.

The outer coatings which are pigmented for decorative purposes and which have been found to have the desired abrasion resistance, scratch resistance, adherence and so forth (for automobile arm rests) are of two general types: chlorosulfonated polyethylene (Hypalon) top coated with vinyl chloride-vinyl acetate copolymer or polyurethane, or polyurethane coatings. One or more coats may be applied. However, other top coatings or finishes such as the acrylics may be used. These coatings are, of course, usually pigmented and deposited from solution in a solvent.

These surface coatings do not discolor on exposure to UV light when the foam is made with a graft polyol especially where the grafting monomer is an unsaturated nitrile like acrylonitrile.

The foams as described herein are useful in making seats for bicycles, motorcycles, tractors, sleds, etc.; seats and arm rests for automobiles, trucks, furniture, etc.; crash pads; head rests for automobiles; windshield moldings; weatherstripping; automobile bumpers and exterior protective strips. Also, the wood in some furniture is being replaced with rigid polyurethanes, e.g., see "Rubber Plastics Age," 49(2):140, February 1968. With the present invention, it is possible after making the rigid frame, to cast the semi-rigid or flexible arm rest and flexible seat and back urethane foamable composition against the frame to make an integral piece of polyurethane furniture.

The following example will serve to illustrate the present invention with more particularity to those skilled in the art.

EXAMPLE

The following formulation was prepared for making a polyurethane integral skin foam.

Ingredients: Parts by weight

Batch 1—
Propylene oxide adduct of a triol at least partially end-capped with ethylene oxide to provide primary hydroxyl groups (Thanol SF-6500, Jefferson Chemical Co., molecular weight of about 6500) _____ 100.0
4,4' - methylene-bis-(2 - chloroaniline), Moca (Du Pont Co.) _____ 10.0
LD-813 (reaction product of formaldehyde and orthochloroaniline, having an amino functionality of about 2.5, equivalent weight about 128, i.e. crude Moca) (Du Pont Co.) _____ 10.0
Dabco 33LV (33% by weight of triethylene diamine in dipropylene glycol, Houdry Process Corp.), dry weight __ 1.5
Channel carbon black, surface area of 105–122 square meters per gram and structure index of 90–107 (20% by weight of the block dispersed in polypropylene ether triol), dry weight ____ 0.2

Batch 2—
NCO terminated prepolymer, reaction product of 122 parts by weight of an 80/20 mixture of 2,4- and 2,6-tolylene diisocyanates and 100 parts by weight of a grafted polyol (acrylonitrile polymerized in situ in admixture with a polypropylene ether triol, Niax Polyol E-204, Union Carbide Chemicals) contains about 20% by weight of polymerized acrylonitrile, molecular weight about 3700, hydroxyl number 43–47 _____ 38.0
Trichloromonofluoromethane (Freon 11 Du Pont Co.) _____ 20.0
Surfactant, polysiloxane-polyoxyalkylene black copolymer (L-540, Union Carbide Chemicals) _____ 0.05

Batch 3—
Dioctyl phthalate _____ 4.0
Stannous octoate _____ 0.14

The batches were separately mixed. Then each batch was pumped through a separate line to the mixing head of a foam machine where all of the ingredients of the batches were thoroughly mixed together and the mixture was delivered from the nozzle of the foam machine into a mold where foaming occurred. After curing, samples were cut from the resulting dark gray-black integral skin polyetherurethane foam and tested as shown below.

Another integral skin polyetherurethane foam was prepared according to the above formulation except that the carbon black or carbon black dispersion was omitted from the formulation. After curing samples of the resulting white integral skin were cut from the foam for testing.

Flame retardancy tests were conducted on the above foams according to Federal Test FS CCC-T-191b, method 5903T. In this test a bunsen burner is used having a flame of 1½ inches. The distance between the tip of the flame and the bottom of the sample is ¾ inch. Samples of both types of foam were tested. Also one lot of samples of foam contained the integral skin while in another lot the integral skin had been removed from the foam. Samples of the foam to be tested measured 2¾" x 12" x ½". The samples were supported between two U-shaped clamps and suspended vertically over the flame which was positioned in the exact center in both directions of the samples.

Test results on above foams (All samples tested in triplicate; values are average of three tests)

TEST RESULTS ON ABOVE FOAMS
[All samples tested in triplicate; values are average of three tests]

| Sample | Ignition time, seconds | Char length, inches | Afterburn time, seconds |
|---|---|---|---|
| White foam, no skin | 12 | 2.3 | 0 |
| Do | 60 | 2.8 | 0 |
| Black foam, no skin | 12 | 2.2 | 0 |
| Do | 60 | 3.3 | 0 |
| White foam with skin | 12 | 1.4 | 0 |
| Do | 60 | [1] 9.3 | [1] 7:29 |
| Black foam with skin | 12 | 2.3 | 0 |
| Do | 60 | [2] 4.1 | [2] 0:14 |

[1] Two samples burned completely (12 inches) with afterburn times of 7:45 and 14:43.
[2] One sample had afterburn time of 0:43. All 24 samples tested melted and dripped, producing flaming droplets.

The above data show the unexpected results obtained in improving the flame retardancy of integral skin polyurethane foams using a very minor amount of carbon black.

The embodiment of the invention in which an exclusive property or privilege is claimed are defined as follows:

1. A flame retardant non-rigid polyurethane foam structure with an integral skin, which structure is characterized by (1) the property that organic polymeric coatings deposited from solution in a solvent on said integral skin do not substantially discolor on exposure to ultraviolet light, (2) a density of from about 4 to 14 pounds per cubic foot for the predominating mass of the foam, (3) a tear strength of at least 8 pounds/inch, and (4) an elongation of at least 200%, said structure comprising the reaction product, in the presence of an organic blowing agent, of a mixture comprising:
   (a) an organic polyisocyanate;
   (b) a polyol selected from the group consisting of
      (I) a polyol having an average molecular weight from about 400 to 15,000 prepared by polymerizing an ethylenically unsaturated monomer in situ in an organic polyol, said monomer being substantially free of hydroxyl groups reactive with —NCO groups, and
      (II) a mixture of a polyol having an average molecular weight from about 400 to 155,000 prepared by polymerizing an ethenically unsaturated monomer in situ in an organic polyol, said monomer being substantially free of hydroxyl groups reactive with —NCO groups and a polyol, other than said first named polyol, in an amount up to about 70% by weight of said polyol mixture;
   (c) at least one aryl amine having at least two amino groups and being selected from the group consisting of
      (A)

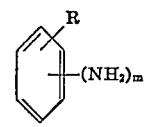

where R is halogen or methoxy and $m$ is 2 or 3;
      (B)

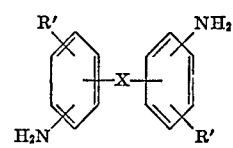

where X is $C_1$ to $C_{10}$ alkylene oxygen,

or a bond joining the two aromatic rings and where R' is hydrogen, halogen or methoxy, at least one R' being halogen or methoxy;

(C)
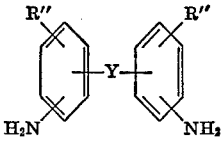

where Y is thio, polythio, seleno, polyseleno, telluro or polytellure and where R'' is hydrogen, halogen or methoxy;

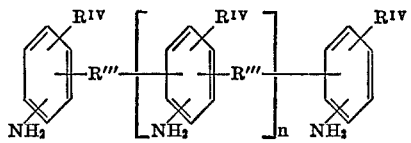

where R''' is $C_1$ to $C_{10}$ alkylene, $R^{IV}$ is hydrogen, halogen or methoxy, at least one $R^{IV}$ being halogen or methoxy, and $n$ is 0.5 to 2; and (E) a mixture of at least one aryl amine of said group of (A), (B), (C) and (D) and up to 50 mole percent of said mixture of at least one aryl amine selected from the group consisting of

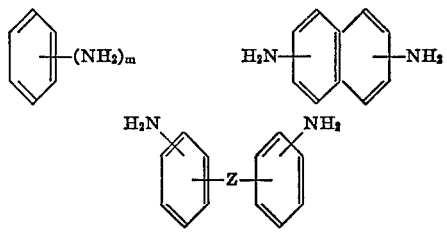

and

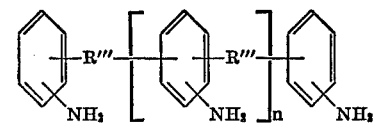

where Z is $C_1$ to $C_{10}$ alkylene, oxygen,

or the bond joining the two aromatic rings, R''' is $C_1$ to $C_{10}$ alkylene, $m$ is 2 or 3 and $n$ is 0.5 2; and (d) from 0.001 to 2.0 parts by weight of carbon black per 100 parts by weight of said reaction product, said carbon black
   (1) being selected from the group consisting of lampblack, channel black, gas furnace black, oil furnace black and thermal black and mixtures thereof;
   (2) having a structure index of from about 30 to 160; and
   (3) having a surface area of from about 5 to 165 meters per gram.

2. A flame retardant non-rigid polyurethane foam structure according to claim 1 in which the carbon black is used in an amount of from about 0.02 to 0.75 part by weight per 100 parts by weight of said reaction product, has a structure index of from about 85 to 115, and has a surface area of from about 100 to 130 square meters per gram.

3. A flame retardant non-rigid polyurethane foam structure according to claim 2 where the carbon black is channel black.

4. A flame retardant non-rigid polyurethane foam structure according to claim 1 where the carbon black is gas furnace black.

5. A flame retardant non-rigid polyurethane foam structure according to claim 1 where the carbon black is oil furnace black.

6. A flame retardant non-rigid polyurethane foam structure according to claim 1 where the carbon black is thermal black.

7. A flame retardant non-rigid polyurethane foam structure according to claim 1 where the carbon black is lampblack.

References Cited
UNITED STATES PATENTS
3,575,896  4/1971  Khan _____ 260—2.5 AZ
3,635,874  1/1972  Laur _____ 260—37 SB OTHER REFERENCES
Scott: Atmospheric Oxidation and Antioxidants, Elsevier Pub. Co., New York, 1965, pp. 185–186.
Kirk-Othmer: Encyclopedia of Chemical Technology, 2nd ed., vol. 4, 1964, pp. 243–256.

DONALD E. CZAJA, Primary Examiner
C. W. IVY, Assistant Examiner

U.S. Cl. X.R.
260—2.5 AJ, 2.5 AK, 2.5 AM, 2.5 AP, 2.55 BB, 2.5 BE; 264—48, Dig. 14

PO-1050
(5/69)

UNITED STATES PATENT OFFICE
CERTIFICATE OF CORRECTION

Patent No. 3,775,350    Dated November 27, 1973

Inventor(s) Benjamin P. Juhas

It is certified that error appears in the above-identified patent and that said Letters Patent are hereby corrected as shown below:

Column 5, line 39, which reads: "exide" should read ---oxide---.

Column 5, lines 43 & 44, which reads: "3,036,966" should read ---3,036,996---.

Column 6, line 29, which reads: "A mixture" should read ---a mixture---.

Column 6, line 59, which reads: "R"" should read ---R'''---.

Column 7, line 63, which reads: "inhbiting" should read ---inhibiting---.

Column 10, line 17, which reads: "an an elongation" should read ---and an elongation---.

Column 11, line 26, which reads: "block" should read ---black---.

Column 11, line 44, which reads: "black" should read ---block---.

Column 12, lines 1-3, which reads: "Test results on above foams (All samples tested in triplicate; values are average of three tests)" should be deleted.

Column 12, line 45, which reads: "155,000" should read ---15,000---.

UNITED STATES PATENT OFFICE
CERTIFICATE OF CORRECTION

Patent No. 3,775,350     Dated November 27, 1973

Inventor(s) Benjamin P. Juhas

It is certified that error appears in the above-identified patent and that said Letters Patent are hereby corrected as shown below:

Column 13, line 12, which reads: "polytellure" should read ---polytelluro---.

Column 13, lines 50 & 51, which reads: "0.5 2" should read ---0.5 to 2---.

Column 14, lines 10 & 11, which reads: "165 meters" should read ---165 square meters---.

Signed and sealed this 2nd day of July 1974.

(SEAL)
Attest

EDWARD M. FLETCHER, JR.
Attesting Officer

C. MARSHALL DANN
Commissioner of Patents